US012687995B2

(12) United States Patent
Lu et al.

(10) Patent No.: US 12,687,995 B2
(45) Date of Patent: Jul. 21, 2026

(54) CONTROL DEVICE HAVING IMAGE OUTPUT

(71) Applicant: DEXIN CORPORATION, New Taipei City (TW)

(72) Inventors: Ho-Lung Lu, New Taipei City (TW); Yuan-Jung Chang, New Taipei City (TW)

(73) Assignee: DEXIN CORPORATION, New Taipei City (TW)

( * ) Notice: Subject to any disclaimer, the term of this patent is extended or adjusted under 35 U.S.C. 154(b) by 0 days.

(21) Appl. No.: 19/008,275

(22) Filed: Jan. 2, 2025

(65) Prior Publication Data

US 2025/0370684 A1      Dec. 4, 2025

Related U.S. Application Data

(60) Provisional application No. 63/652,720, filed on May 29, 2024.

(30) Foreign Application Priority Data

Oct. 9, 2024    (TW) ................................. 113138375

(51) Int. Cl.
*G06F 3/14*            (2006.01)
*G06F 3/02*            (2006.01)
*G06F 3/0338*          (2013.01)

(52) U.S. Cl.
CPC .................. *G06F 3/14* (2013.01); *G06F 3/02* (2013.01); *G06F 3/0338* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0061736 A1* | 3/2008 | Ho | ............................ | H02J 7/00 |
| | | | | 320/111 |
| 2010/0162011 A1* | 6/2010 | Min | .................... | G06F 13/4295 |
| | | | | 713/300 |
| 2012/0280960 A1* | 11/2012 | Sheng | ..................... | G06F 1/266 |
| | | | | 345/211 |
| 2017/0160860 A1* | 6/2017 | Yin | ........................ | G06F 3/0416 |

* cited by examiner

*Primary Examiner* — William Boddie
*Assistant Examiner* — Alecia D English
(74) *Attorney, Agent, or Firm* — Li & Cai Intellectual Property (USA) Office

(57)            ABSTRACT

A control device having image output includes a transmission interface and a control circuit. The transmission interface has a first transmission port and a second transmission port. When the first transmission port is connected to a handheld device, the control device obtains a first input power supplied by the handheld device through the first transmission port, and when the second transmission port is connected to a first external device, the control circuit identifies the first external device. When the first external device is a display device, the control circuit controls the handheld device to supply power to the display device, and controls the display device to display a display signal of the handheld device. When the first external device is a charging device, the control circuit controls the charging device to supply power to the handheld device.

20 Claims, 11 Drawing Sheets

CONTROL DEVICE HAVING IMAGE OUTPUT

CROSS-REFERENCE TO RELATED PATENT APPLICATION

This application claims the benefit of priority to Taiwan Patent Application No. 113138375, filed on Oct. 9, 2024. The entire content of the above identified application is incorporated herein by reference.

This application further claims the benefit of priority to the U.S. Provisional Patent Application Ser. No. 63/652,720, filed on May 29, 2024 which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control device, and more particularly to a control device having image output.

BACKGROUND OF THE DISCLOSURE

Handheld devices are easy to carry along for operation. However, certain users do not regard the performance of the control function of the handheld devices as meeting their personal needs. Therefore, control devices that can be combined with the handheld devices are made to be commercially available. Through a mechanical design, such control devices allow the characteristic of portability to persist when the control device and the handheld device are combined into one.

Therefore, for certain users who place emphasis on the convenience of control (such as video game players), when the aforementioned control device is combined with the handheld device, through a control interface provided by the control device, corresponding input and control can be provided to and performed on the handheld device, respectively. However, since a display image of the handheld device is limited by a size of the handheld device, a viewing experience of the handheld device during overall operation will also be limited.

SUMMARY OF THE DISCLOSURE

In response to the above-referenced technical inadequacies, the present disclosure provides a control device having image output.

In order to solve the above-mentioned problems, one of the technical aspects adopted by the present disclosure is to provide a control device having image output. The control device includes a transmission interface and a control circuit. The transmission interface has a first transmission port and a second transmission port. When the first transmission port is connected to a handheld device, the control device obtains a first input power supplied by the handheld device through the first transmission port, and when the second transmission port is connected to a first external device, the control circuit identifies the first external device. When the control circuit identifies that the first external device is a display device, the control circuit controls the first input power to be output to the second transmission port to supply power to the display device, and the control circuit obtains a display signal from the handheld device through the first transmission port, and controls the display signal to be output through the second transmission port to the display device for display. When the control circuit identifies that the first external device is a charging device, the control circuit stops receiving the first input power and obtains a second input power supplied by the charging device through the second transmission port, and the control device controls the second input power to be output to the first transmission port to supply power to the handheld device.

In order to solve the above-mentioned problems, another one of the technical aspects adopted by the present disclosure is to provide a control device having image output. The control device includes a transmission interface and a control circuit. The transmission interface has a first transmission port, a second transmission port, and a third transmission port. When the first transmission port is connected to a handheld device, the control circuit obtains a first input power supplied by the handheld device through the first transmission port. When the second transmission port is connected to the handheld device and the third transmission port is connected to a second external device, the control circuit identifies the first external device. When the control circuit identifies that the first external device is a charging device and the second external device connected to the third transmission port is a display device, the control circuit stops receiving the first input power, obtains a second input power supplied by the charging device through the second transmission port, and controls the second input power to be output to the first transmission port to supply power to the handheld device and output to the third transmission port to supply power to the display device. The control circuit obtains a display signal of the handheld device through the first transmission port, and controls the display signal to be output through the third transmission port to the display device for display.

Therefore, in the control device having image output provided by the present disclosure, when the handheld device is used in combination with the control device, the display image on the handheld device can be displayed on the display device external to the control device, and the control device can also be connected to different external devices according to requirements of use, thereby improving the convenience of the control device during operation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

3

Figure 3:
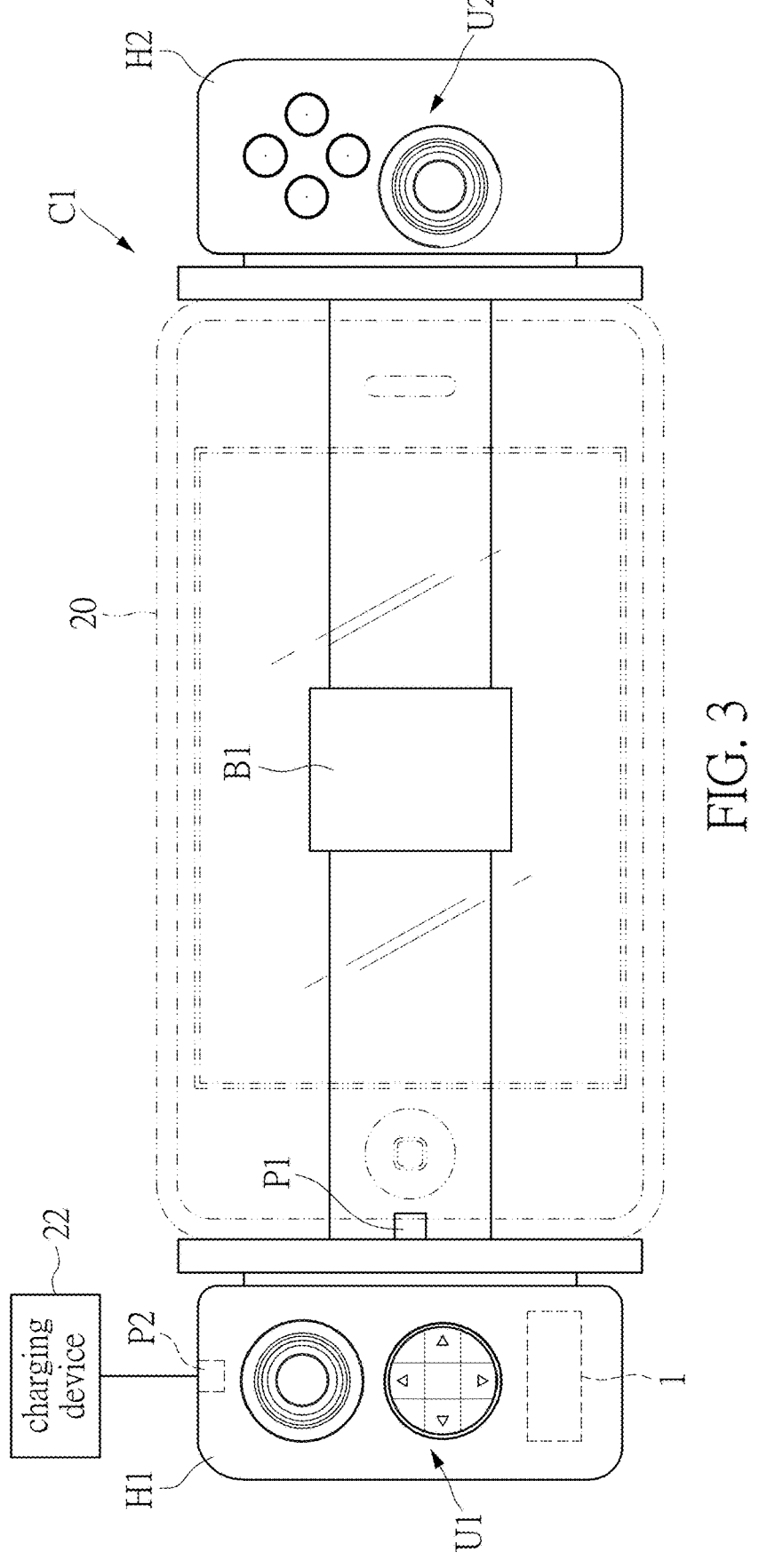
Figure 4:
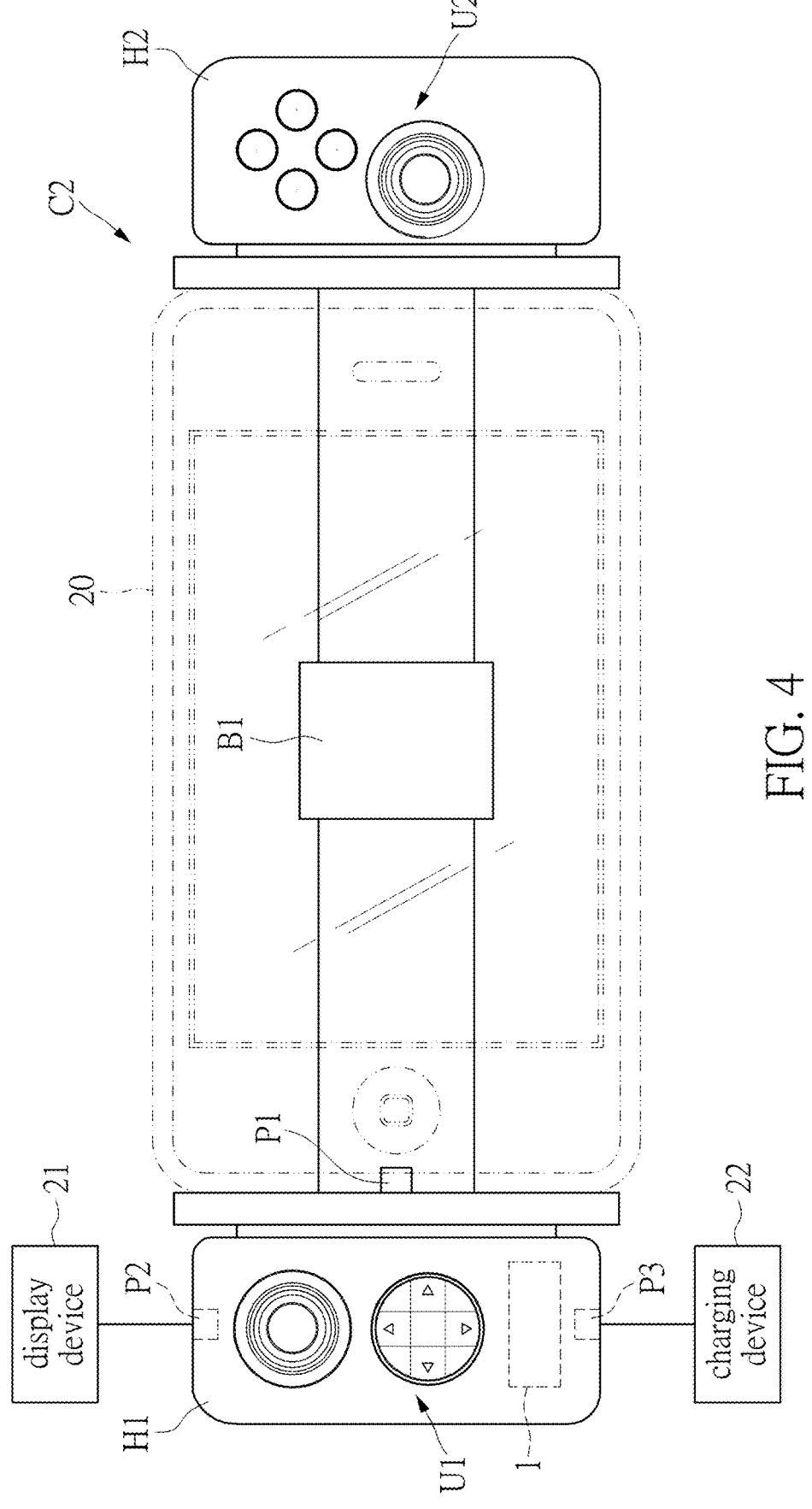
Figure 5:
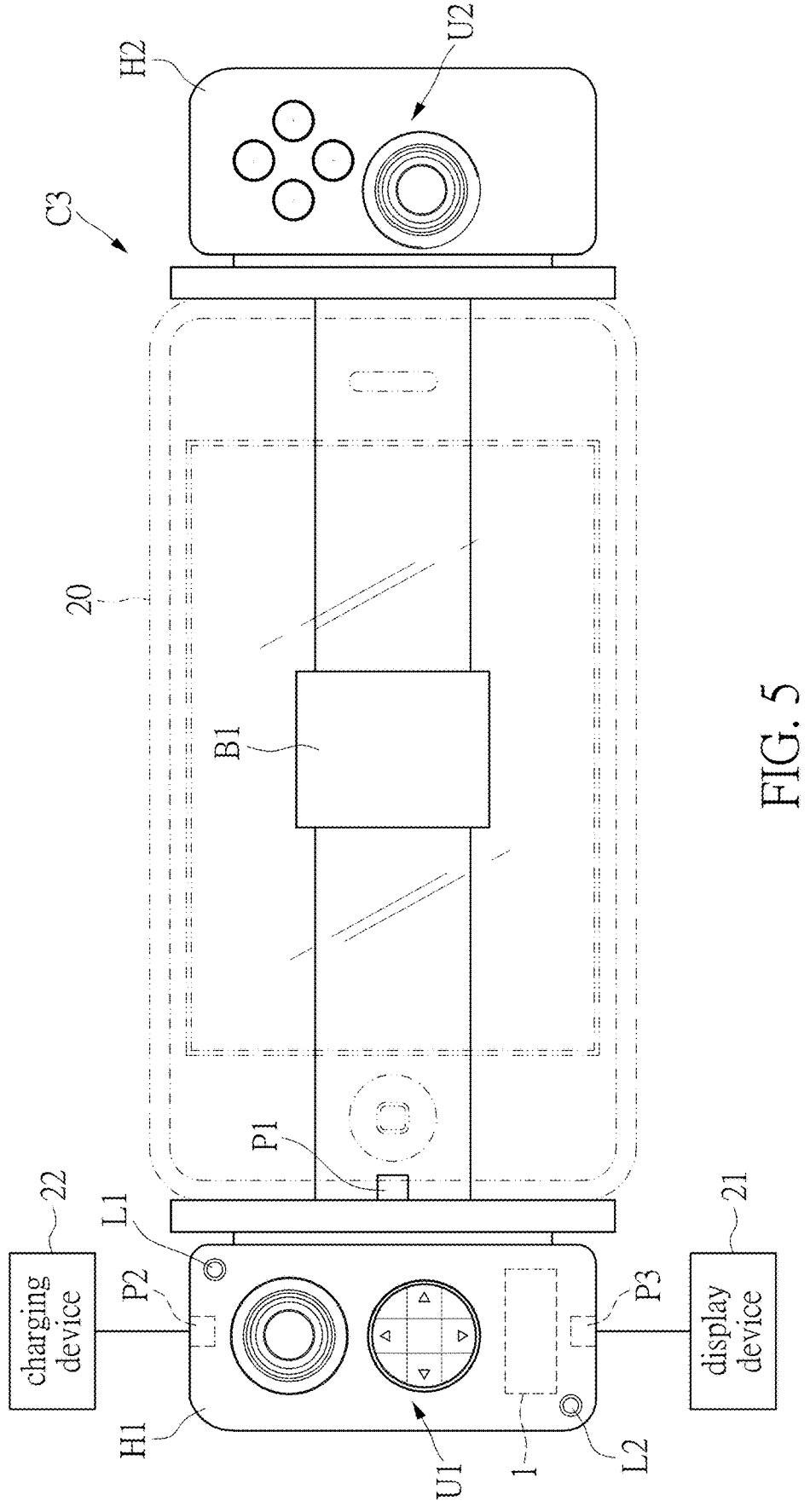
Figure 6:
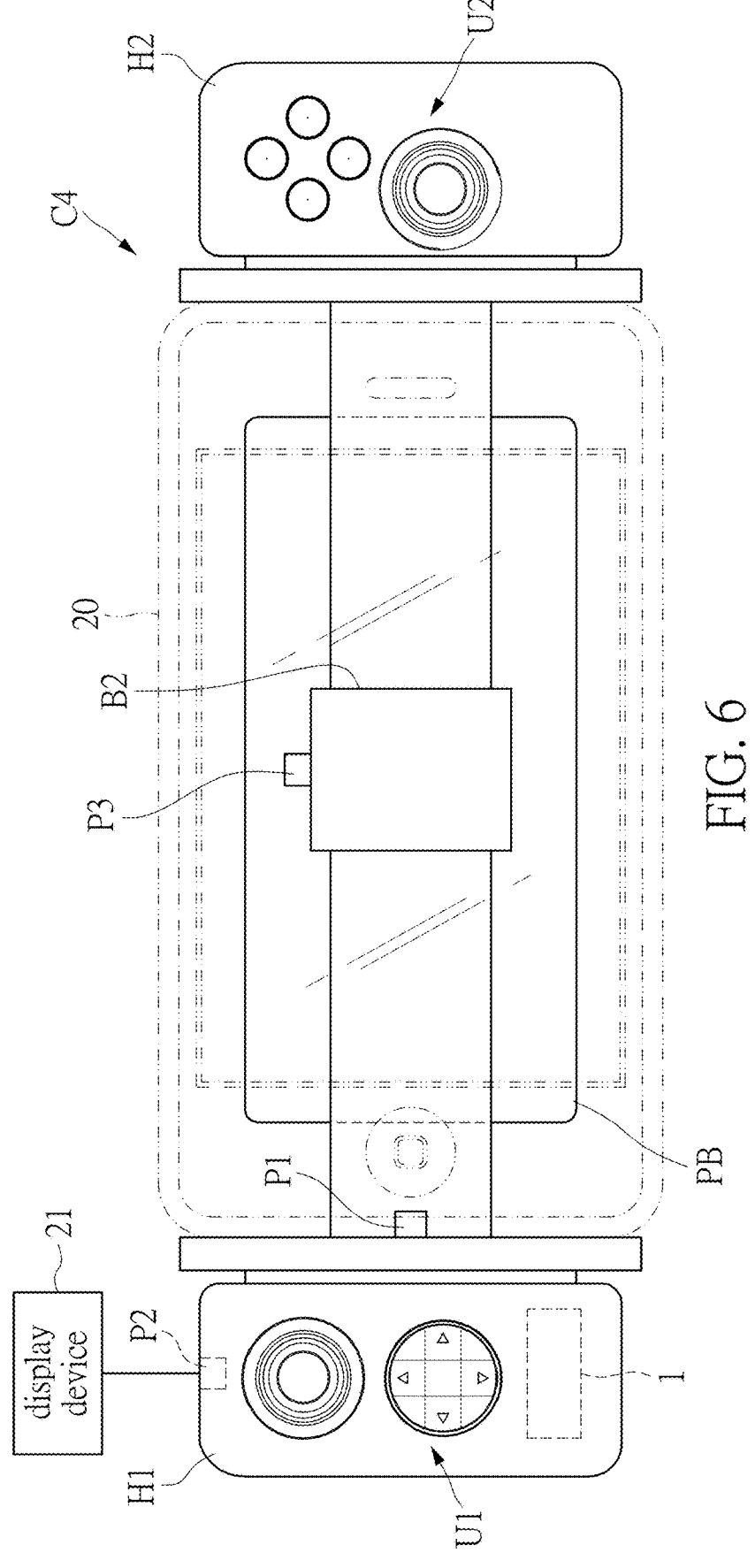
Figure 7:
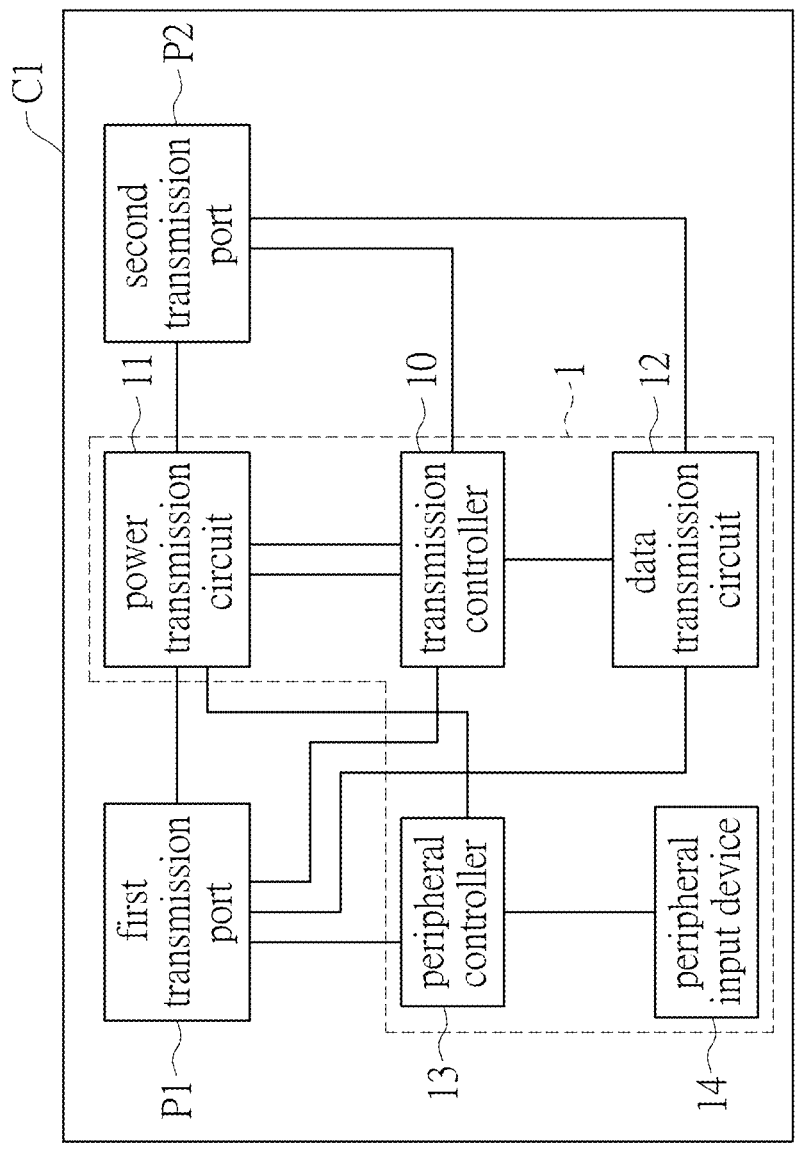
Figure 8:
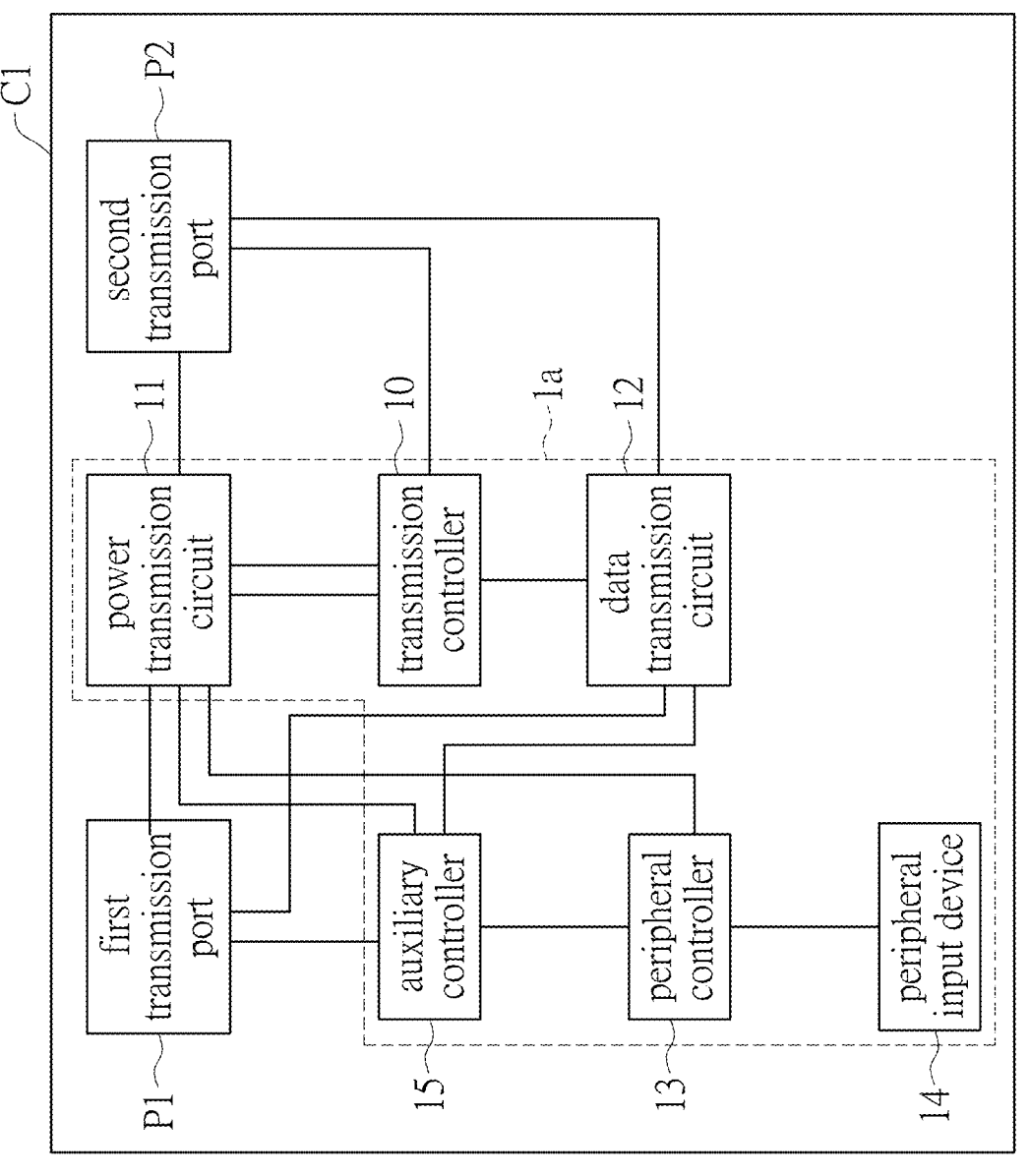
Figure 9:
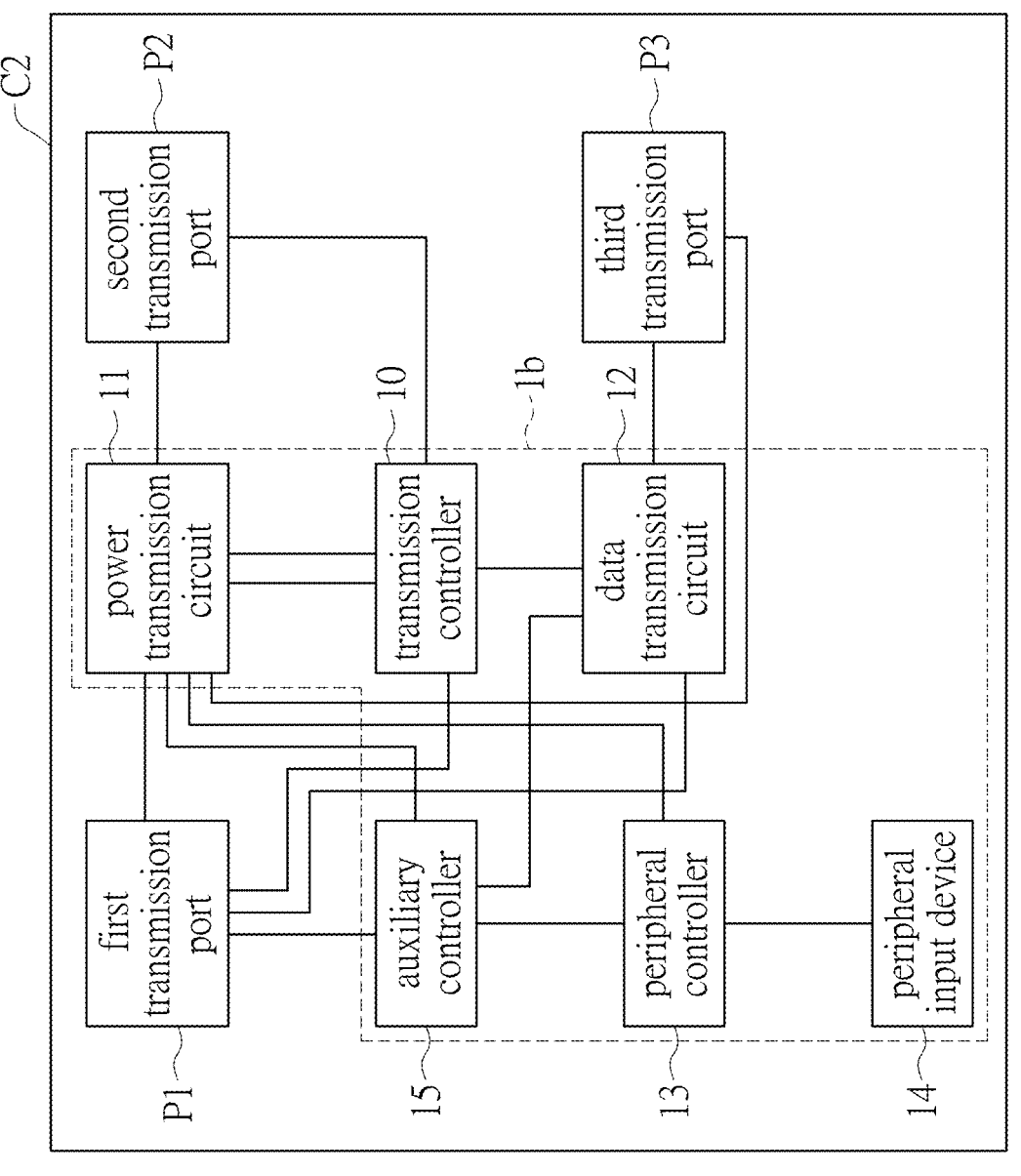
Figure 10:
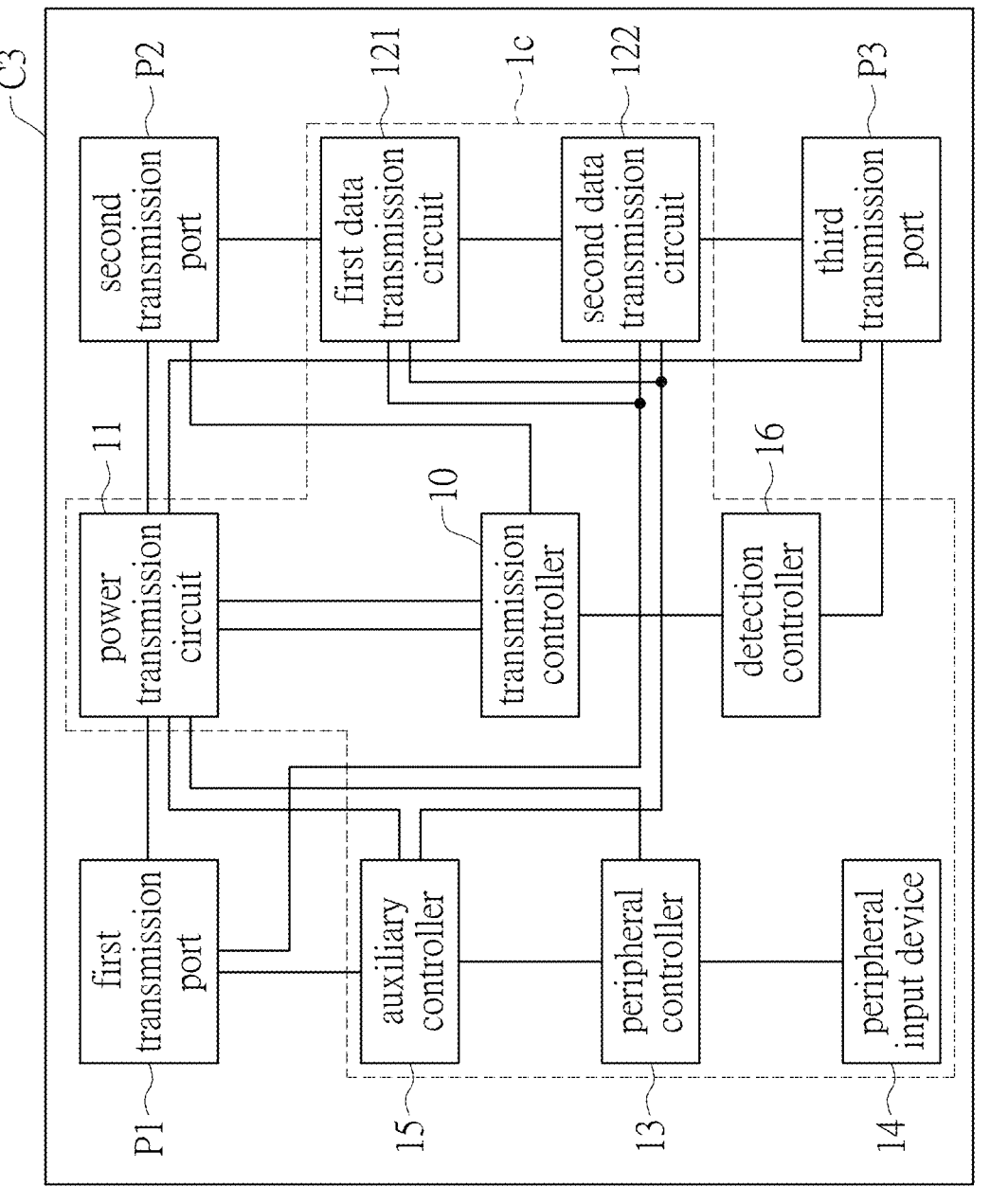
Figure 11:
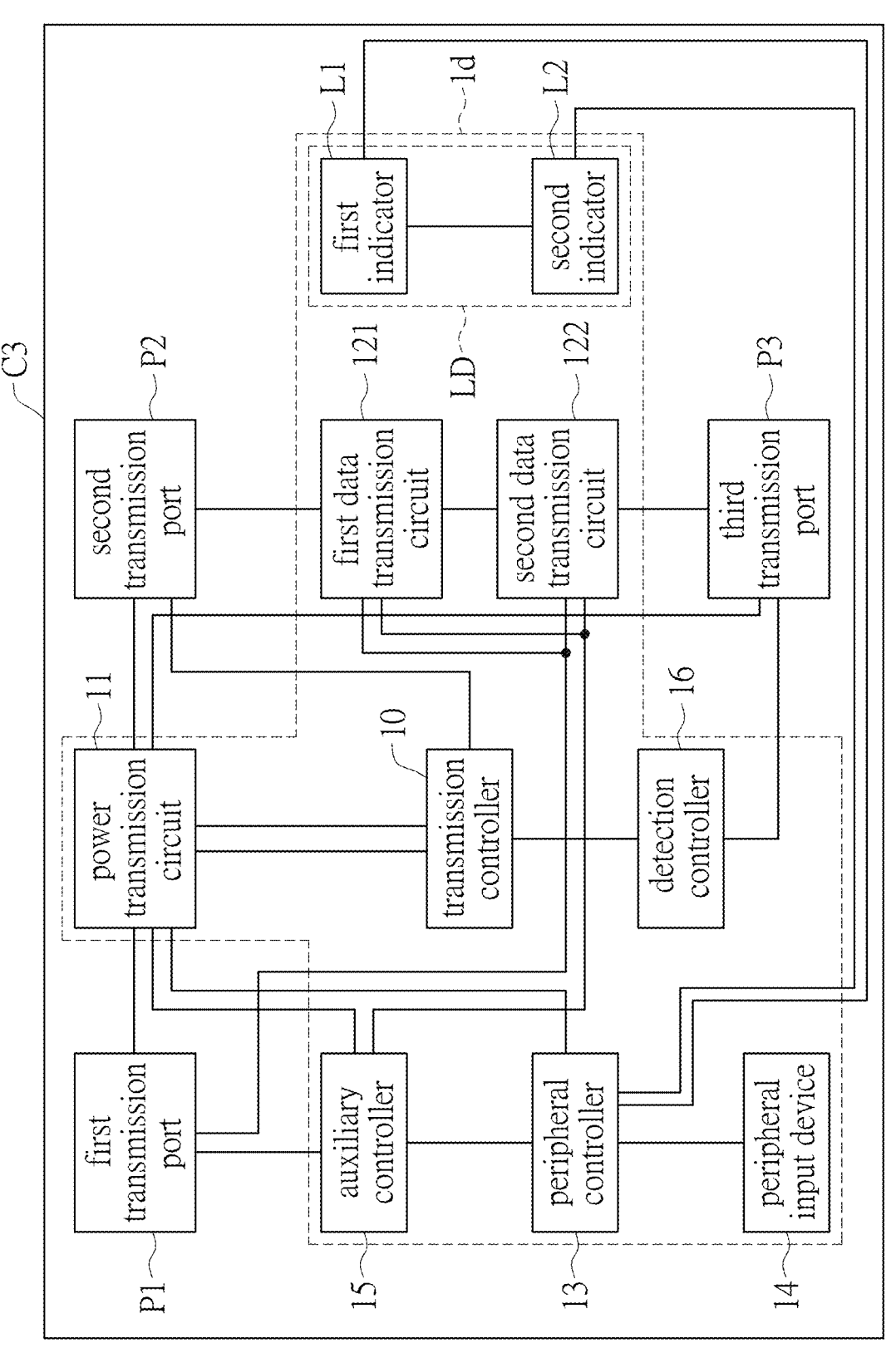

FIG. 3 is a schematic diagram of a connection between the control device and a charging device according to one embodiment of the present disclosure;

FIG. 4 is a schematic diagram of a connection between the control device and multiple external devices according to one embodiment of the present disclosure;

FIG. 5 is another schematic diagram of the connection between the control device and the multiple external devices according to one embodiment of the present disclosure;

FIG. 6 is another schematic diagram of the connection between the control device and the charging device according to one embodiment of the present disclosure;

FIG. 7 is a circuit block diagram of the control device according to one embodiment of the present disclosure;

FIG. 8 is another circuit block diagram of the control device according to one embodiment of the present disclosure;

FIG. 9 is yet another circuit block diagram of a control device according to one embodiment of the present disclosure;

FIG. 10 is still another circuit block diagram of the control device according to one embodiment of the present disclosure; and FIG. 11 is still another circuit block diagram of the control device according to one embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a control device having image output. The control device here can be combined with a handheld device to allow a user to perform various input operations on the handheld device through the control device. For example, when the control device is connected to the handheld device through a transmission interface, an input signal generated by the control device according to a user operation can be transmitted to the handheld device through the transmission interface. On the other hand, the control device can be connected to external devices having different functions to be expanded for different uses. For example, the control device can output a display image of the handheld device to the external device for display, or the control device can obtain an input power to charge the handheld device, thereby improving the operational convenience of the control device.

Control Embodiments of the Control Device

Figure 1:
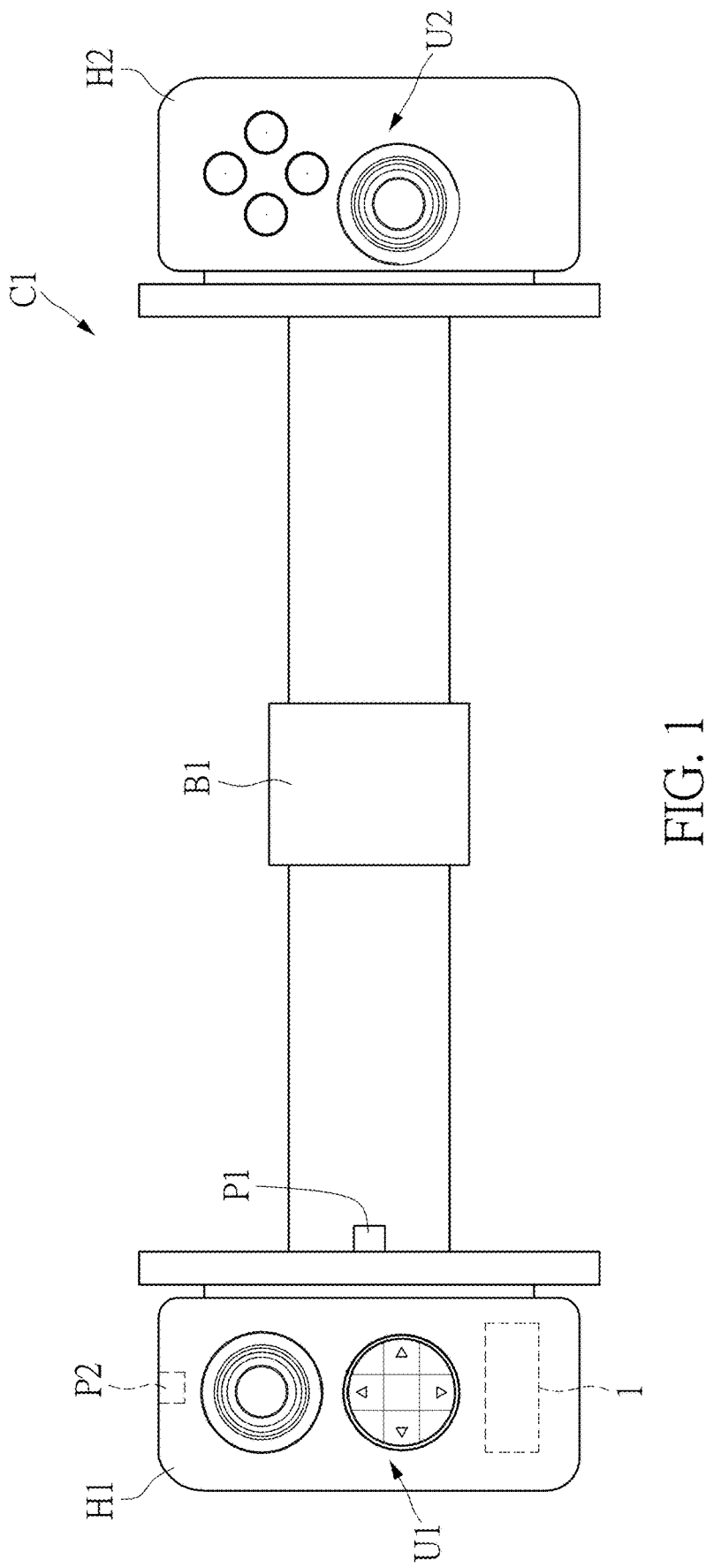
FIG. 1 is a schematic structural diagram of a control device having image output according to one embodiment of the present disclosure.
Figure 2:
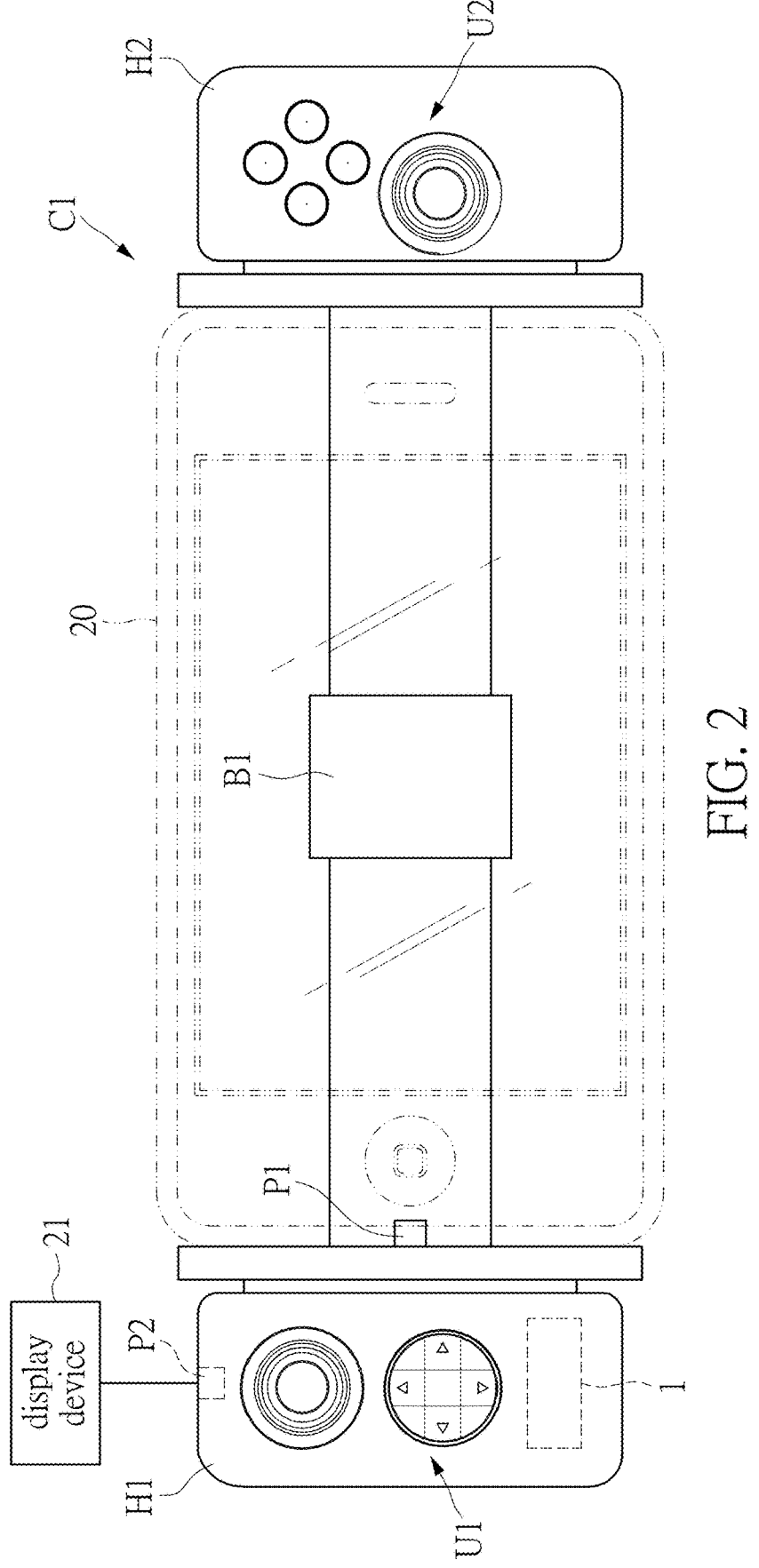
FIG. 2 is a schematic diagram of a connection between the control device and a display device according to one embodiment of the present disclosure.

Referring to FIG. 1 and FIG. 2, FIG. 1 is a schematic structural diagram of a control device having image output according to one embodiment of the present disclosure, and FIG. 2 is a schematic diagram of a connection between the control device and a display device according to one embodiment of the present disclosure. A control device C1 having image output in this embodiment can perform input control on a handheld device through control interfaces U1, U2, such that a user can perform various controls on software executed in a handheld device 20 through the operation on the control interfaces U1, U2. The control device C1 is connected, for example, through a bridge mechanism B1 between two handles H1, H2 for being operated by the left and right hands of the user. When the handheld device 20 is used in combination with the control device C1, the handheld device 20 can be positioned between the two handles H1, H2. However, in other embodiments, a position of combining the handheld device 20 and the control device C1 can also be at any other positions available for operation according to actual use requirements.

In one embodiment, the bridge mechanism B1 can have a variety of different implementation modes such as telescopic, bending, or insertion, such that the two handles H1, H2 can be integrally connected through the bridge mechanism B1. The bridge mechanism B1 can also provide a signal transmission channel between the two handles H1, H2, such that input signals generated by a user operation on the control interfaces U1, U2 of any one of the two handles H1, H2 can be smoothly transmitted to the handheld device.

In one embodiment, transmission interfaces provided by the control device C1 includes at least a first transmission port P1 and a second transmission port P2. The first transmission port P1 is available for connection to the handheld device 20 and the second transmission port P2 is available for connection to an external device. The control device C1 can correspondingly determine the function of the second transmission port P2 according to the different objects connected to the second transmission port P2. Here, the first transmission port P1 is used for fixed connection with the handheld device 20, and the external device connected to the second transmission port P2 can be different types of external devices according to different functions and operational requirements.

For convenience of explanation, the first transmission port P1 and the second transmission port P2 are jointly disposed on the handle H1. However, in other embodiments, the first transmission port P1 and the second transmission port P2 can also be disposed on different handles, respectively, such as the handle H2. For example, the first transmission port P1 in FIG. 1 can be disposed on one side of the handle H1 adjacent to the bridge mechanism B1, and the second transmission port P2 can be selectively disposed on any side of the handle H1 according to the connection requirements of external devices.

In one embodiment, the handle H1 includes a control circuit 1. The control circuit 1 is connected to the first transmission port P1 and the second transmission port P2, respectively. The control circuit 1 can control transmission directions of data or power between the first transmission port P1 and the second transmission port P2. For example, the control circuit 1 can transmit input signals generated by the control interfaces U1, U2 of the control device C1 to the handheld device 20 through the first transmission port P1. The control circuit 1 determines whether an external device is a power supply device or a power receiving device by identifying the external device connected to the second transmission port P2. In other embodiments, only one of the control interface U1 or the control interface U2 is disposed and located on one of the handles H1 or H2.

In one embodiment, when the external device is a power receiving device, the control circuit 1 can obtain a display signal and a first input power of the handheld device 20 through the first transmission port P1, and transmit the display signal and the first input power to the external device through the second transmission port P2. When the external device is a power supply device, the control circuit 1 can obtain a second input power supplied by the external device through the second transmission port P2, and transmit the second input power to the handheld device 20 through the first transmission port P1.

In one embodiment, when the power supply device is such as a charging device, the charging device can charge the handheld device 20 through the control device C1. When the power receiving device is such as a display device, the display device can receive the display signal of the handheld device 20 through the control device C1 and display the display signal, and the power used by the display device to operate can be supplied by the handheld device 20.

In one embodiment, the handheld device 20 is, for example, a mobile phone, a tablet computer, a handheld computer, a handheld gaming console, a navigation device, or a video playback device. The first transmission port P1 and the second transmission port P2 may be connectors, and the connectors may be configured as male connectors or female connectors according to usage requirements. The connector can be compliant with universal serial bus (USB) transmission specifications. Furthermore, the connectors are, for example, USB Type-C transmission port interfaces or connectors that can transmit image signals and power signals.

Referring to FIG. 2, the control device C1 shown in FIG. 2 is respectively connected to an external device and the handheld device 20. Here, the external device is a display device 21 as an example.

When the control device C1 is used in combination with the handheld device 20, for example, when the first transmission port P1 of the control device C1 is connected to the handheld device 20 and the second transmission port P2 of the control device C1 is connected to the display device 21, the control circuit 1 in the control device C1 at this time can determine through the second transmission port P2 that the external device that is currently connected to the second transmission port P2 is the display device 21, and can control the handheld device 20 to output a display signal to the display device 21 based on this determination result. For example, the display signal of the handheld device 20 can be transmitted through the first transmission port P1 and the second transmission port P2 to the display device 21 for display. At the same time, the first input power of the handheld device 20 will also supply power to the display device 21 through the first transmission port P1 and the second transmission port P2. That is, at this time, the display device 21 can obtain the first input power supplied by the handheld device 20 to operate, and can also display the display signal provided by the handheld device 20.

In one embodiment, the display device 21 is, for example, virtual-reality (VR) glasses or a flat display. Accordingly, when the user operates the handheld device 20 through the control device C1, a display image of the handheld device 20 can be transmitted to the display device 21 for display, thereby improving operational convenience.

Reference is made to FIG. 3, which is a schematic diagram of a connection between the control device and a charging device according to one embodiment of the present disclosure. The control device C1 shown in FIG. 3 is respectively connected to an external device and the handheld device 20. Here, the external device is exemplified by a charging device 22.

When the control device C1 is used in combination with the handheld device 20, for example, when the first transmission port P1 of the control device C1 is connected to the handheld device 20 and the second transmission port P2 of the control device C1 is connected to the charging device 22, the control circuit 1 in the control device C1 at this time can determine via the second transmission port P2 the external device that is currently connected to the second transmission port P2 is the charging device 22, and can control the charging device 22 to charge the handheld device 20 based on this determination result.

For example, the charging signal of the charging device 22 can charge the handheld device 20 through the second transmission port P2 and the first transmission port P1, and the charging signal can be the second input power. Since the external device at this time is not the display device 21 shown in FIG. 2, the display signal of the handheld device 20 is not transmitted to the external device for display via the first transmission port P1 and the second transmission port P2 as shown in FIG. 2. Further, at this time, the first input power of the handheld device 20 is not input to the control device C1.

That is, under the configuration of FIG. 3, the control device C1 can obtain the second input power supplied by the charging device 22, and the second input power can charge the handheld device 20, so as to extend a use time of the handheld device 20.

In one embodiment, the charging device 22 is, for example, a charger or a power bank.

Reference is made to FIG. 4, which is a schematic diagram of a connection between the control device and multiple external devices according to one embodiment of the present disclosure. The control device shown in FIG. 4 is respectively connected to multiple external devices and the handheld device 20. Here, the multiple external devices are exemplified by the display device 21 and the charging device 22.

When a control device C2 is used in combination with the handheld device 20, for example, a first transmission port P1 of the control device C2 is connected to the handheld device 20, a second transmission port P2 of the control device C2 is connected to the display device 21, and a third transmission port P3 of the control device C2 is connected to the charging device 22. At this time, the second transmission port P2 of the control device C2 is fixedly connected to the display device 21 and the third transmission port P3 is fixedly connected to the charging device 22. Compared with the control device C1 in FIG. 3, the control device C2 shown in FIG. 4 has an additional third transmission port P3. Here, the control device C2 can be connected to multiple external devices through the second transmission port P2 and the third transmission port P3.

For example, when a control circuit 1 of the control device C2 determines through the second transmission port P2 that the first external device currently connected to the second transmission port P2 is the display device 21 and that the second external device currently connected to the third transmission port P3 is the charging device 22, the control circuit 1 of the control device C2 at this time can control the charging device 22 to charge the handheld device 20 and supply power to the display device 21. For example, the charging signal of the charging device 22 can charge the handheld device 20 through the third transmission port P3 and the first transmission port P1, the charging signal of the charging device 22 can also supply power to the display device 21 through the third transmission port P3 and the second transmission port P2, and the display signal of the handheld device 20 can be transmitted through the first transmission port P1 and the second transmission port P2 to the display device 21 for display.

In one embodiment, in the structure shown in FIG. 4, since the external objects connected to the second transmission port P2 and the third transmission port P3 are fixed, when the second transmission port P2 is connected to an object other than the display device 21, the second transmission port P2 at this time does not function; alternatively, when the third transmission port P3 is connected to an object other than the charging device 22, the third transmission port P3 also does not function. When only the second transmission port P2 among the second transmission port P2 and the third transmission port P3 is connected to the display device 21, a manner of control for the control device C2 at this time can refer to FIG. 2; and when only the third transmission port P3 among the second transmission port P2 and the third transmission port ports P3 is connected to the charging device 22, a manner of control for the control device C2 at this time can refer to FIG. 3.

Accordingly, through the structure shown in FIG. 4, the control device C2 can output the display image of the handheld device 20 to the display device 21 for display, and the handheld device 20 does not need to supply power to the display device 21; at this time, the charging device 22 supplies power to the display device 21. At the same time, the charging device 22 can charge the handheld device 20, such that the user can use this connection structure to watch the display device 21 for a long time and ensure that the handheld device 20 can operate for a long time.

Reference is made to FIG. 5, which is another schematic diagram of the connection between the control device and the multiple external devices according to one embodiment of the present disclosure. The control device shown in FIG. 5 is respectively connected to multiple external devices and the handheld device 20. Here, the external devices are exemplified by the display device 21 and the charging device 22.

When a control device C3 is used in combination with the handheld device 20, for example, a first transmission port P1 of the control device C3 is connected to the handheld device 20, at this time, external devices to be connected to a second transmission port P2 and a third transmission port P3 of the control device C3 can be flexibly selected as the display device 21 or the charging device 22 according to the usage requirements. As shown in FIG. 5, the second transmission port P2 of the control device C3 is connected to the charging device 22, and the third transmission port P3 of the control device C3 is connected to the display device 21.

Furthermore, when a control circuit 1 of the control device C3 determines through the second transmission port P2 that the first external device currently connected to the second transmission port P2 is the charging device 22 and the second external device currently connected to the third transmission port P3 is the display device 21, the control circuit 1 of the control device C3 at this time can control the charging device 22 to charge the handheld device 20 and supply power to the display device 21. For example, the charging signal (i.e., the second input power) of the charging device 22 can charge the handheld device 20 through the second transmission port P2 and the first transmission port P1, and the charging signal of the charging device 22 can supply power to the display device 21 through the second transmission port P2 and the third transmission port P3, and the display signal of the handheld device 20 can be displayed on the display device 21 through the first transmission port P1 and the third transmission port P3. Similarly, when the control circuit 1 of the control device C3 determines that a manner of connection of the second transmission port P2 and the third transmission port P3 is as shown in FIG. 4, relative control can be performed with reference to the aforementioned manner of FIG. 4.

It is worth noting that, the control device C3 shown in FIG. 5 can determine the function of the transmission port at this time based on which of the second transmission port P2 and the third transmission port P3 is connected first, that is, based on the object first connected to the transmission ports. For example, when the control circuit 1 first determines that the first external device connected to the second transmission port P2 is the charging device 22, the control circuit 1 can configure the third transmission port P3 connected to the second external device to be used for connecting to the display device 21; alternatively, when the control circuit 1 first determines that the first external device connected to the third transmission port P3 is the charging device 22, the control circuit 1 can configure the second transmission port P2 connected to the second external device to be used for connecting to the display device 21.

It is worth noting that, in the structure shown in FIG. 5, the control device C3 can automatically identify the connection objects of the second transmission port P2 and the third transmission port P3, that is, the connection objects of the second transmission port P2 and the third transmission port P3 are not fixed, thereby increasing the operational convenience for the user to flexibly connect and use different external devices on the control device C3.

In one embodiment, the control device C3 in FIG. 5 can further include a corresponding indication interface to guide the user to know the current object (such as the display device 21 or the charging device 22) connected to the second transmission port P2 and the third transmission port P3.

For example, the indication interface may respectively provide a first indicator L1 and a second indicator L2 on one side adjacent to the second transmission port P2 and another side adjacent to the third transmission port P3 as shown in FIG. 5. When the first external device that is first connected to the second transmission port P2 is the charging device 22, the first indicator L1 adjacent to the second transmission port P2 displays a corresponding light signal (such as a first indication signal) of the charging device 22, and the second indicator L2 adjacent to the third transmission port P3 displays a corresponding light signal (such as a second indication signal) of the display device 21. When the first external device that is first connected to the third transmission port P3 is the charging device 22, the second indicator L2 adjacent to the third transmission port P3 displays a corresponding light signal (such as the first indication signal) of the charging device 22, and the first indicator L1 adjacent to the second transmission port P2 displays a corresponding light signal (such as the second indication signal) of the display device 21, such that the user can clearly acknowledge through this light signal display the connection objects connected to the second transmission port P2 and the third transmission port P3.

In one embodiment, the first indicator L1 is a first light-emitting element and the second indicator L2 is a second light-emitting element, the first indication signal is a first light signal and the second indication signal is a second light signal. The first light signal and the second light signal display light signals different from each other. The first light-emitting element is disposed to be adjacent to the second transmission port P2 and the second light-emitting element is disposed to be adjacent to the third transmission port P3. Each of the first light-emitting element and the second light-emitting element can be, for example, a light-emitting diode (LED).

Reference is made to FIG. 6, which is another schematic diagram of the connection between the control device and the charging device according to one embodiment of the present disclosure. A control device C4 shown in FIG. 6 is connected to the charging device and the handheld device 20. Here, the charging device is exemplified by a power bank PB.

As shown in FIG. 6, a connection position of the power bank PB is a bridge mechanism B2 between the two handles H1, H2. That is, the third transmission port P3 can be disposed adjacent to the bridge mechanism B2, such that the power bank PB can be mounted on the bridge mechanism B2, and the power bank PB can be connected to the third transmission port P3. Therefore, a first transmission port P1 of the control device C4 is connected to the handheld device 20, a second transmission port P2 of the control device C4 is connected to the display device 21, and a third transmission port P3 of the control device C4 is connected to the charging device. At this time, the display device 21 is VR glasses and the charging device is the power bank PB. Since the power bank PB is mounted on one side of the bridge mechanism B2, and the handheld device 20 is located on an opposite side of the bridge mechanism B2, the handheld device 20 and the power bank PB are respectively located on front and rear sides of the bridge mechanism B2. Further, with the user directly wearing VR glasses, the user can still operate the control device C4 smoothly through hand-holding the control device C4 even when the user is moving.

Circuit Embodiment of the Control Device

Reference is made to FIG. 7, which is a circuit block diagram of the control device according to one embodiment of the present disclosure. The control circuit 1 in the control device C1 shown in FIG. 7 includes, for example, but is not limited to, a transmission controller 10, a power transmission circuit 11, a data transmission circuit 12, a peripheral controller 13, and a peripheral input device 14. The transmission controller 10 is connected to the first transmission port P1, the second transmission port P2, the power transmission circuit 11, the data transmission circuit 12, and the peripheral controller 13. The power transmission circuit 11 is connected to the first transmission port P1 and the second transmission port P2. The peripheral controller 13 is connected to the first transmission port P1 and the peripheral input device 14. The data transmission circuit 12 is connected to the first transmission port P1 and the second transmission port P2.

In one embodiment, when the first transmission port P1 is connected to the handheld device 20, the transmission controller 10 and the peripheral controller 13 respectively communicate with the handheld device 20 through the first transmission port P1, and then the transmission controller 10 and the peripheral controller 13 can obtain a power supply provided by the handheld device 20 through the power transmission circuit 11, thereby allowing the control device C1 to operate normally. For example, the peripheral controller 13 is responsible for various input operations of the peripheral input device 14 and transmits input signals generated by the peripheral input device 14 to the handheld device 20 through the first transmission port P1 to control the operation of the handheld device 20. Here, the peripheral input device 14 is used as the control interfaces U1 and U2 of the control device C1. The peripheral input device 14 can be, for example, various combinations of buttons and analog sticks. The buttons can further be digital buttons or analog buttons.

For example, a manner of communication between the transmission controller 10 and the handheld device 20 or an external device is as the following. The transmission controller 10 has a first identification pin and a second identification pin, and the first identification pin is connected to the first transmission port P1 and the second identification pin is connected to the second transmission port P2. Therefore, the transmission controller 10 can know a connection status of the handheld device 20 through the first identification pin, identify an external device through the second identification pin, and correspondingly control the power transmission circuit 11 to transmit the first input power or the second input power according to identification results of the first identification pin and the second identification pin.

Specifically, the transmission controller 10 is responsible for the transmission of data or power between the first transmission port P1 and the second transmission port P2. For example, when the control device C1 is connected to the handheld device 20 through the first transmission port P1 and connected to the external device that is the display device 21 through the second transmission port P2 as shown in FIG. 2, the second identification pin of the transmission controller 10 communicates with the external device through the second transmission port P2 to know that the external device is the display device 21. Afterwards, the first identification pin of the transmission controller 10 can communicate with the handheld device 20 connected to the first transmission port P1 to notify the handheld device 20 to continue supplying power to the control device C1. That is, the first input power of the handheld device 20 will continue to be input to the power transmission circuit 11 through the first transmission port P1. In addition to the transmission controller 10 controlling the power transmission circuit 11 to transmit the first input power to the peripheral controller 13 and the transmission controller 10 to supply power, the power transmission circuit 11 also transmits the first input power to the second transmission port P2 at the same time, such that the display device 21 connected to the second transmission port P2 can obtain the first input power to operate properly.

Furthermore, the transmission controller 10 has notified the handheld device 20 connected to the first transmission port P1 through the first identification pin that the second transmission port P2 is currently connected to the display device 21. Therefore, the transmission controller 10 can further obtain the display signal output by the handheld device 20 through the first transmission port P1, and control the display signal to be transmitted through the data transmission circuit 12 to the display device 21 connected to the second transmission port P2, such that the display device 21 can perform playback after receiving the display signal.

On the other hand, as shown in FIG. 3, when the control device C1 is connected to the handheld device 20 at the first transmission port P1 and the external device connected at the second transmission port P2 is the charging device 22, the second identification pin of the transmission controller 10 communicates with the external device through the second transmission port P2 to know that the external device is the charging device 22. Afterwards, the first identification pin of the transmission controller 10 can communicate with the handheld device 20 connected to the first transmission port P1 to notify the handheld device 20 that the handheld device 20 no longer needs to supply power to the control device C1. That is, at this time, the first input power of the handheld device 20 does not need to be continuously input to the power transmission circuit 11 through the first transmission port P1, and the power supply is changed to the second input power supplied by the charging device 22. The transmission controller 10 will control the power transmission circuit 11 to transmit the second input power to the peripheral controller 13 and the transmission controller 10 for power supply, and the power transmission circuit 11 will also transmit the second input power to the first transmission port P1 at the same time, such that the handheld device 20 connected to the first transmission port P1 can obtain the second input power to be charged.

Furthermore, the transmission controller 10 has notified the handheld device 20 connected to the first transmission port P1 through the first identification pin that the second transmission port P2 is connected to the charging device 22. Therefore, the display signal of the handheld device 20 does not need to be transmitted to the control device C1. That is, at this time, the transmission controller 10 controls the data transmission circuit 12 to stop transmitting data to the charging device 22 connected to the second transmission port P2.

Specifically, the transmission controller 10 in FIG. 7 communicates with the external connection object through the first transmission port P1 and the second transmission port P2 respectively, and, according to the communication results, controls the power transmission circuit 11 to perform corresponding power supply transmission and the data transmission circuit 12 to perform corresponding data transmission. Here, the power transmission circuit 11 has a bidirectional power transmission function. For example, the power transmission circuit 11 can obtain an input power from one of the first transmission port P1 and the second transmission port P2, and output the input power to the other transmission port. Further, the power transmission circuit 11 obtains and uses this input power as a power source for the operation of related components within the control device C1.

Reference is made to FIG. 8, which is another circuit block diagram of the control device according to one embodiment of the present disclosure. Compared with FIG. 7, the configuration of the control device shown in FIG. 8 includes an auxiliary controller 15. Here, only differences between the different configurations are described. Details regarding the components that have the same numerals can be referred to in FIG. 7. The auxiliary controller 15 in a control circuit 1a as shown in FIG. 8 is connected between the first transmission port P1, the power transmission circuit 11, and the peripheral controller 13.

The auxiliary controller 15 can obtain the power supply through the power transmission circuit 11. The power supply can be the first input power obtained via an external connection between the first transmission port P1 and the handheld device 20, or can be the second input power supplied via the charging device 22 externally connected to the second transmission port P2.

In one embodiment, the auxiliary controller 15 can individually process audio data in the display signal of the handheld device 20 and then output an audio signal to the data transmission circuit 12. At this time, the data transmission circuit 12 can respectively output the image data (obtained from the first transmission port P1) and the audio data (obtained from the auxiliary controller 15) in the display signal of the handheld device 20 to the display device 21 externally connected to the second transmission port P2.

It should be noted that, the display device 21 connected to the second transmission port P2 in FIG. 8 supports independent reception of image data and audio data, which is different from the display device 21 connected to the second transmission port P2 in FIG. 7, in which the display device 21 supports a single audio-visual transmission interface that can simultaneously receive image data and audio data. This single audio-visual transmission interface is, for example, a DisplayPort (DP) transmission interface. That is, the auxiliary controller 15 in the control device C1 shown in FIG. 8 can individually extract and process the audio data in a DP display signal provided by the handheld device 20 in the first transmission port P1, and then output the audio data from the data transmission circuit 12 to the display device 21 connected to the second transmission port P2. Therefore, when the display device 21 that uses an audio part independently from the image data receives the image data and the independent audio data in the DP display signal, the image data and the independent audio data can still be played normally.

Reference is made to FIG. 9, which is yet another circuit block diagram of a control device according to one embodiment of the present disclosure. Compared with FIG. 8, the configuration of the control device C2 shown in FIG. 9 includes a third transmission port P3. Here, only differences between the different configurations are described. Details regarding the components that have the same numerals can be referred to in FIG. 7 and FIG. 8. The third transmission port P3 shown in FIG. 9 is connected to the data transmission circuit 12 and the power transmission circuit 11.

As shown in FIG. 9, the first external device connected to the second transmission port P2 and the second external device connected to the third transmission port P3 are fixed. In one embodiment, a control circuit 1b here controls the first external device to fixedly be a charging device 22 and the second external device to fixedly be a display device 21.

For example, when the control device C2 only has the first transmission port P1 connected to the handheld device 20, and the transmission controller 10 communicates with the handheld device 20 through the first transmission port P1, the transmission controller 10 controls the power transmission circuit 11 to receive the first input power supplied by the handheld device 20 through the first transmission port P1, and the first input power can be further allocated to the transmission controller 10, the auxiliary controller 15, and the peripheral controller 13 for use.

Then, when the third transmission port P3 of the control device C2 is first connected to the display device 21 and then the second transmission port P2 is connected to the charging device 22, the transmission controller 10 communicates with the handheld device 20 through the first transmission port P1 and communicates with the charging device 22 through the second transmission port P2, and the transmission controller 10 controls the power transmission circuit 11 to receive the second input power supplied by the charging device 22 through the second transmission port P2. In addition to be allocated to the transmission controller 10, the auxiliary controller 15, and the peripheral controller 13, the second input power can also charge the handheld device 20 through the first transmission port P1 and charge the display device 21 through the third transmission port P3.

Furthermore, the transmission controller 10 controls the data transmission circuit 12 to obtain the display signal of the handheld device 20, and the data transmission circuit 12 outputs the display signal of the handheld device 20 to the display device 21 through the third transmission port P3 for playback. Taking the structure shown in FIG. 9 as an example, the display signal of the handheld device 20 is, for example, a DP display signal. When the DP display signal is input into the control device C2 through the first transmission port P1, the DP display signal is divided into image data and audio data to be transmitted separately. The image data in the DP display signal is directly output to the data transmission circuit 12, the audio data in the DP display signal is transmitted to the auxiliary controller 15, and the auxiliary controller 15 processes the audio data to have an audio playback format suitable for the display device 21. Finally, the data transmission circuit 12 can transmit the image data and the audio data in the DP display signal to the display device 21 for playback.

In one embodiment, when the control device C2 in FIG. 9 is connected to the handheld device 20, the second transmission port P2 is first connected to the charging device 22, and then the third transmission port P3 is connected to the display device 21. When the transmission controller 10 detects and acknowledges this status, the transmission controller 10 can control the display device 21 to stop operation.

In one embodiment, when the control device C2 in FIG. 9 is connected to the handheld device 20, only the third transmission port P3 is connected to the display device 21. When the transmission controller 10 detects and acknowledges this status, the transmission controller 10 can control the display device 21 to stop operation.

Reference is made to FIG. 10, which is still another circuit block diagram of the control device according to one embodiment of the present disclosure. Compared with FIG. 9, the configuration of the control device shown in FIG. 10 includes a detection controller 16 and an additional data transmission circuit (such as a second data transmission circuit 122). Here, only differences between the different configurations are described. Details regarding the components that have the same numerals can be referred to in the foregoing embodiments.

It should be noted that the first external device connected to the second transmission port P2 and the second external device connected to the third transmission port P3 shown in FIG. 10 are not fixed. In one embodiment, the control device C2 is controlled by a control circuit 1c. The first external device may be the charging device 22 and the second external device may be the display device 21, or the first external device may be the display device 21 and the second external device may be the charging device 22, or one of the first external device and the second external device may be a combination of a charging device (or a display device) and an input device (such as a mouse or a keyboard).

The detection controller 16 in FIG. 10 is connected to the transmission controller 10 and the third transmission port P3; a first data transmission circuit 121 is connected to the first transmission port P1, the auxiliary controller 15, and the second transmission port P2; and the second data transmission circuit 122 is connected to the first transmission port P1, the auxiliary controller 15, and the third transmission port P3. The third identification pin of the transmission controller 10 can be connected to the detection controller 16, and the transmission controller 10 communicates with the external device connected to the third transmission port P3 through the third identification pin. The third identification pin of the transmission controller 10 identifies the second external device connected to the third transmission port P3 through the detection controller 16. In other embodiments, the third identification pin of the transmission controller 10 may also be directly connected to the third transmission port P3 to identify the second external device.

In one embodiment, the first transmission port P1 of the control device C3 in FIG. 10 is connected to the handheld device 20, the first external device subsequently connected to the second transmission port P2 is the charging device 22, and the second external device connected to the third transmission port P3 is the display device 21. At this time, the transmission controller 10 can acknowledge a latest connection status of the control device C3 based on the communication results of the first identification pin, the second identification pin, and the third identification pin. Then, the transmission controller 10 can control the power transmission circuit 11 to obtain the second input power supplied by the charging device 22 from the second transmission port P2. In addition to the power transmission circuit 11 allocating the second input power to the transmission controller 10, the auxiliary controller 15, and the peripheral controller 13, the second input power can further charge the handheld device 20 through the first transmission port P1 and supply power to the display device 21 through the third transmission port P3. At the same time, the transmission controller 10 controls the second data transmission circuit 122 to obtain the display signal of the handheld device 20, and the second data transmission circuit 122 outputs the display signal of the handheld device 20 to the display device through the third transmission port P3 for playback.

In one embodiment, the first transmission port P1 of the control device C3 in FIG. 10 is connected to the handheld device 20, the first external device subsequently connected to the second transmission port P2 is the display device 21, and the second external device connected to the third transmission port P3 is the charging device 22. At this time, the transmission controller 10 can acknowledge a latest connection status of the control device C3 based on the communication results of the first identification pin, the second identification pin, and the third identification pin. The transmission controller 10 can control the power transmission circuit 11 to obtain the second input power supplied by the charging device 22 from the third transmission port P3. In addition to the power transmission circuit 11 allocating the second input power to the transmission controller 10, the auxiliary controller 15, and the peripheral controller 13, the second input power can also be used to charge the handheld device 20 through the first transmission port P1 and supply power to the display device 21 through the second transmission port P2. At the same time, the transmission controller 10 controls the first data transmission circuit 121 to obtain the display signal of the handheld device 20, and the first data transmission circuit 121 outputs the display signal of the handheld device 20 to the display device 21 through the second transmission port P2 for playback.

Reference is made to FIG. 11, which is still another circuit block diagram of the control device according to one embodiment of the present disclosure. Compared with FIG. 9, the configuration of the control device C3 shown in FIG. 11 includes an additional indication interface LD. Here, only differences between the different configurations are described. Details regarding the components that have the same numerals can be referred to in the foregoing embodiments.

In one embodiment, the indication interface LD in a control circuit 1$d$ is connected to the peripheral controller 13, and the peripheral controller 13 is connected to the transmission controller 10. The peripheral controller 13 correspondingly controls the indication interface LD according to the identification results of the transmission controller 10 at the second identification pin and the third identification pin.

In one embodiment, the indication interface LD includes, for example, a first indicator L1 and a second indicator L2. When the first external device is the charging device 22 and the second external device is the display device 21, the peripheral controller 13 controls the first indicator L1 to present a first indication signal and the second indicator L2 to present a second indication signal. When the first external device is the display device 21 and the second external device is the charging device 22, the peripheral controller 13 controls the first indicator L1 to present the second indication signal and the second indicator L2 to present the first indication signal.

In one embodiment, the auxiliary controller 15 in FIG. 8 to FIG. 11 is suitable for the display device 21 connected to the control device C1 to independently use the audio data in the DP display signal. If the display device 21 connected to the control device C1 can directly support the use of the DP display signal (that is, the audio data in the DP display signal is not used independently), the above-mentioned control device C1 does not need to use the auxiliary controller 15; that is, the display signal of the first transmission port P1 is directly transmitted to the data transmission circuit 12.

In one embodiment, the first transmission port P1, the second transmission port P2, and the third transmission port P3 are connectors compliant with the USB Type-C specifications, and the first identification pin, the second identification pin, and the third identification pin of the transmission controller 10 can communicate with the objects connected to the first transmission port P1, the second transmission port P2, and the third transmission port P3 respectively through configuration channel (CC) pins, and the object that is connected is acknowledged according to CC channel signals of the pins. In addition, the first transmission port P1, the second transmission port P2, and the third transmission port P3 may be USB Type-C transmission port interfaces with support for DisplayPort (DP) image function, such that the display signal of the handheld device 20 can be transmitted through the control device C1 to be output to another display device, and the another display device plays the image and audio in the display signal.

In one embodiment, the control circuit 1 can be, for example, one or any combination of an application-specific integrated circuit (ASIC), a field programmable gate array (FPGA), or a system-on-a-chip (SOC), and can be used in conjunction with other related circuits and firmware to realize the above-mentioned functions and processes.

In one embodiment, the transmission controller 10 may be a USB-PD controller, the peripheral controller 13 may be a USB controller, and the auxiliary controller 15 may be a USB hub.

Beneficial Effects of the Embodiments

In conclusion, in the control device having image output provided by the present disclosure, when the handheld device is used in combination with the control device, the display image on the handheld device can be displayed on the display device external to the control device, and the control device can also be connected to different external devices according to requirements of use, thereby improving the convenience of the control device during operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control device having image output, comprising:

a transmission interface having a first transmission port and a second transmission port; and a control circuit, wherein, when the first transmission port is connected to a handheld device, the control device obtains a first input power supplied by the handheld device through the first transmission port, and when the second transmission port is connected to a first external device, the control circuit identifies the first external device;

wherein, when the control circuit identifies that the first external device is a display device, the control circuit controls the first input power to be output to the second transmission port to supply power to the display device, and the control circuit obtains a display signal from the handheld device through the first transmission port, and controls the display signal to be output through the second transmission port to the display device for display;

wherein, when the control circuit identifies that the first external device is a charging device, the control circuit stops receiving the first input power and obtains a second input power supplied by the charging device through the second transmission port, and the control device controls the second input power to be output to the first transmission port to supply power to the handheld device;

wherein the control circuit includes:

a transmission controller having a first identification pin and a second identification pin, wherein the first identification pin is connected to the first transmission port, and the second identification pin is connected to the second transmission port; and a power transmission circuit connected to the first transmission port, the second transmission port, and the transmission controller;

wherein the transmission controller identifies the first external device through the second identification pin, and correspondingly controls the power transmission circuit according to an identification result of the second identification pin to transmit the first input power or the second input power.

2. The control device according to claim 1, wherein the control circuit further includes:

a data transmission circuit connected to the first transmission port and the second transmission port;

a peripheral input device; and a peripheral controller connected to the power transmission circuit, the first transmission port and the peripheral input device, wherein the peripheral controller generates an input signal to the first transmission port according to an operation of the peripheral input device to control the handheld device.

3. The control device according to claim 2, wherein, when the first external device is the charging device, the transmission controller controls the power transmission circuit to obtain the second input power and stop receiving the first input power, and the second input power is transmitted to the transmission controller, the peripheral controller, and the first transmission port.

4. The control device according to claim 2, wherein, when the first external device is the display device, the transmission controller controls the power transmission circuit to obtain the first input power, and the first input power is transmitted to the second transmission port, the transmission controller, and the peripheral controller, and wherein the transmission controller controls the data transmission circuit to output the display signal to the second transmission port.

5. The control device according to claim 2, further comprising an auxiliary controller connected to the first transmission port and the peripheral controller, wherein the auxiliary controller receives an audio signal that is input via the first transmission port and outputs the audio signal to the data transmission circuit, and the data transmission circuit outputs the audio signal to the second transmission port.

6. The control device according to claim 2, wherein the peripheral input device is a button device or an analog stick device, and the charging device is a charger or a power bank.

7. A control device having image output, comprising:

a transmission interface having a first transmission port, a second transmission port, and a third transmission port; and a control circuit, wherein, when the first transmission port is connected to a handheld device, the control circuit obtains a first input power supplied by the handheld device through the first transmission port, and wherein, when the second transmission port is connected to the handheld device and the third transmission port is connected to a second external device, the control circuit identifies the first external device;

wherein, when the control circuit identifies that the first external device is a charging device and the second external device connected to the third transmission port is a display device, the control circuit stops receiving the first input power, obtains a second input power supplied by the charging device through the second transmission port, and controls the second input power to be output to the first transmission port to supply power to the handheld device and output to the third transmission port to supply power to the display device, and wherein the control circuit obtains a display signal of the handheld device through the first transmission port, and controls the display signal to be output through the third transmission port to the display device for display;

wherein the control circuit includes:

a transmission controller having a first identification pin and a second identification pin, wherein the first identification pin is connected to the first transmission port, and the second identification pin is connected to the second transmission port; and a power transmission circuit connected to the first transmission port, the second transmission port, the third transmission port, and the transmission controller;

wherein the transmission controller identifies the first external device through the second identification pin, and correspondingly controls the power transmission circuit according to an identification result of the second identification pin to transmit the first input power or the second input power.

8. The control device according to claim 7, wherein the control circuit further includes:

a data transmission circuit connected to the first transmission port and the third transmission port;

a peripheral input device; and a peripheral controller connected to the power transmission circuit, the first transmission port and the peripheral input device, wherein the peripheral controller generates an input signal to the first transmission port according to an operation of the peripheral input device to control the handheld device.

9. The control device according to claim 8, further comprising an auxiliary controller connected to the first transmission port and the peripheral controller, and the auxiliary controller receives an audio signal that is input via the first transmission port and outputs the audio signal to the data transmission circuit.

10. The control device according to claim 8, wherein the peripheral input device is a button device or an analog stick device, and the charging device is a charger or a power bank.

11. A control device having image output, comprising:

a transmission interface having a first transmission port, a second transmission port, and a third transmission port; and a control circuit, wherein, when the first transmission port is connected to a handheld device, the control circuit obtains a first input power supplied by the handheld device through the first transmission port, and wherein, when the second transmission port is connected to the handheld device and the third transmission port is connected to a second external device, the control circuit identifies the first external device;

wherein, when the control circuit identifies that the first external device is a charging device and the second external device connected to the third transmission port is a display device, the control circuit stops receiving the first input power, obtains a second input power supplied by the charging device through the second transmission port, and controls the second input power to be output to the first transmission port to supply power to the handheld device and output to the third transmission port to supply power to the display device, and wherein the control circuit obtains a display signal of the handheld device through the first transmission port, and controls the display signal to be output through the third transmission port to the display device for display;

wherein the control circuit includes:

a transmission controller having a first identification pin, a second identification pin, and a third identification pin, wherein the first identification pin is connected to the first transmission port, the second identification pin is connected to the second transmission port, and the third identification pin is connected to the third transmission port;

a first data transmission circuit connected to the first transmission port and the second transmission port;

a second data transmission circuit connected to the first transmission port and the third transmission port;

a peripheral input device;

a peripheral controller connected to the first transmission port and the peripheral input device, wherein the peripheral controller generates an input signal to the first transmission port according to an operation of the peripheral input device to control the handheld device; and a power transmission circuit connected to the first transmission port, the second transmission port, the third transmission port, the transmission controller, and the peripheral controller;

wherein the transmission controller identifies the first external device and the second external device through the second identification pin and the third identification pin, and uses identification results of the second identification pin and the third identification pin to correspondingly control operations of the power transmission circuit, the first data transmission circuit, and the second data transmission circuit.

12. The control device according to claim 11, wherein, when the transmission controller identifies that the first external device is the charging device and the second external device is the display device, the transmission controller controls the power transmission circuit to transmit the second input power to the first transmission port, the third transmission port, and the peripheral controller, and the transmission controller controls the second data transmission circuit to output the display signal to the third transmission port.

13. The control device according to claim 12, further comprising an auxiliary controller connected to the first transmission port, the peripheral controller, the first data transmission circuit, and the second data transmission circuit, wherein the auxiliary controller receives an audio signal that is input via the first transmission port, and the transmission controller controls the second data transmission circuit to output the audio signal to the third transmission port.

14. The control device according to claim 11, wherein, when the transmission controller identifies that the first external device is the display device and the second external device is the charging device, the transmission controller controls the power transmission circuit to transmit the second input power to the first transmission port, the second transmission port, and the peripheral controller, and wherein the transmission controller controls the first data transmission circuit to output the display signal to the second transmission port.

15. The control device according to claim 14, wherein the third transmission port is disposed in a bridge mechanism of the control device, and the bridge mechanism is disposed between a first handle and a second handle of the control device, and wherein the charging device is a power bank and the display device is virtual-reality (VR) glasses, and when the power bank is connected to the third transmission port, the power bank is mounted on the bridge mechanism.

16. The control device according to claim 14, further comprising an auxiliary controller connected to the first transmission port, the peripheral controller, the first data transmission circuit, and the second data transmission circuit, wherein the auxiliary controller receives an audio signal that is input via the first transmission port, and the transmission controller controls the first data transmission circuit to output the audio signal to the second transmission port.

17. The control device according to claim 11, further comprising a detection controller connected between the transmission controller and the third transmission port, wherein the transmission controller identifies the second external device through the detection controller.

18. The control device according to claim 11, further comprising:

an indication interface connected to the peripheral controller, wherein the peripheral controller is connected to the transmission controller, and the peripheral controller correspondingly controls the indication interface according to identification results of the transmission controller at the second identification pin and the third identification pin.

19. The control device according to claim 18, wherein the indication interface includes a first indicator and a second indicator, and when the first external device is the charging device and the second external device is the display device, the peripheral controller controls the first indicator to provide a first indication signal and the second indicator to provide a second indication signal; wherein, when the first external device is the display device and the second external device is the charging device, the peripheral controller controls the first indicator to provide the second indication signal and the second indicator to provide the first indication signal.

20. The control device according to claim 19, wherein the first indicator is a first light-emitting element and the second indicator is a second light-emitting element, and the first indication signal is a first light signal and the second indication signal is a second light signal, and wherein the first light signal and the second light signal display light signals that are different from each other, the first light-emitting element is disposed adjacent to the second transmission port and the second light-emitting element is disposed adjacent to the third transmission port, and the first light-emitting element and the second light-emitting element are light-emitting diodes.

* * * * *